(12) United States Patent
Hirooka et al.

(10) Patent No.: US 8,555,744 B2
(45) Date of Patent: Oct. 15, 2013

(54) GEAR MECHANISM AND ROBOT HAVING THE SAME

(75) Inventors: Yasuo Hirooka, Akashi (JP); Yasuhiko Hashimoto, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 1480 days.

(21) Appl. No.: 10/586,789

(22) PCT Filed: Jan. 21, 2005

(86) PCT No.: PCT/JP2005/000782
§ 371 (c)(1),
(2), (4) Date: Aug. 17, 2006

(87) PCT Pub. No.: WO2005/071285
PCT Pub. Date: Aug. 4, 2005

(65) Prior Publication Data
US 2008/0048090 A1    Feb. 28, 2008

(30) Foreign Application Priority Data

Jan. 23, 2004    (JP) ................. 2004-016178

(51) Int. Cl.
*B25J 17/00*    (2006.01)
*F16H 55/18*    (2006.01)
*F16H 57/00*    (2012.01)
*F16H 1/06*    (2006.01)

(52) U.S. Cl.
USPC .............. 74/490.01; 74/440; 74/409; 74/410; 74/413; 901/19

(58) Field of Classification Search
USPC ......... 74/384, 397, 440, 490.01, 490.06, 409, 74/441, 410, 413, 414, 398, 399; 901/15, 901/16, 19
IPC ................................. F16H 1/20,55/18
See application file for complete search history.

(56) References Cited

U.S. PATENT DOCUMENTS

| | | | | |
|---|---|---|---|---|
| 1,864,348 A | * | 6/1932 | Given | 74/411 |
| 2,397,777 A | * | 4/1946 | Colman | 74/409 |
| 2,737,056 A | * | 3/1956 | Baumgartner | 74/440 |
| 2,810,299 A | | 10/1957 | Partridge | |

(Continued)

FOREIGN PATENT DOCUMENTS

| | | | |
|---|---|---|---|
| EP | 386645 A1 | * | 9/1990 |
| JP | U 64-4948 | | 1/1989 |

(Continued)

*Primary Examiner* — Phillip A Johnson
*Assistant Examiner* — Daniel Yabut
(74) *Attorney, Agent, or Firm* — Oliff & Berridge, PLC

(57) ABSTRACT

The present gear mechanism includes a base body member, a first gear supported on the base body member so as to rotate about a first rotational axis, a second gear capable of being meshed with the first gear, a support member supporting the second gear so as to rotate about a second rotational axis and placed on the base body member so as to be movable in approaching and leaving directions respectively toward and away from the first rotational axis, and a retaining member engaged in a threaded hole formed in the base body member and capable of being turned so as to move in the approaching and leaving directions, and directly or indirectly engaged with the support member to restrain the support member from moving in the leaving direction away from the first rotational axis.

16 Claims, 12 Drawing Sheets

(56) References Cited

U.S. PATENT DOCUMENTS

| | | | |
|---|---|---|---|
| 2,895,342 A * | 7/1959 | Hayhurst | 74/409 |
| 3,171,212 A * | 3/1965 | Michalec | 74/440 |
| 3,331,256 A * | 7/1967 | Morris | 74/397 |
| 3,397,589 A * | 8/1968 | Moore | 74/397 |
| 3,523,003 A * | 8/1970 | Hambric | 74/409 |
| 3,657,940 A * | 4/1972 | Wagner | 74/397 |
| 3,889,549 A * | 6/1975 | Fieuzal et al. | 74/409 |
| 4,942,777 A * | 7/1990 | Fife | 74/397 |
| 5,540,112 A * | 7/1996 | Baker et al. | 74/409 |
| 6,109,129 A * | 8/2000 | Genter et al. | 74/440 |
| 6,289,758 B1 * | 9/2001 | Kugio et al. | 74/354 |
| 6,301,986 B1 * | 10/2001 | Berky | 74/410 |
| 2004/0221670 A1 * | 11/2004 | Becker et al. | 74/411.5 |

FOREIGN PATENT DOCUMENTS

| | | |
|---|---|---|
| JP | U 7-35846 | 7/1995 |
| JP | A 7-332440 | 12/1995 |
| JP | A-8-47878 | 2/1996 |
| JP | A 8-47878 | 2/1996 |
| JP | A 63-185595 | 8/1998 |
| JP | A 2002-98198 | 4/2002 |
| JP | A 2002-172572 | 6/2002 |
| JP | A-2002-172572 | 6/2002 |
| WO | WO 88/05714 | 8/1999 |

* cited by examiner

-- PRIOR ART --

--PRIOR ART--

GEAR MECHANISM AND ROBOT HAVING THE SAME

CROSS REFERENCE TO RELATED APPLICATIONS

This application is based on and claims the benefit of priority from the prior Japanese Patent Application No. 2004-16178, the entire contents of which are incorporated herein by reference.

TECHNICAL FIELD

The present invention relates to a gear mechanism capable of changing the center distance between gears, and a robot provided with the gear mechanism. For example, the present invention relates to a gear mechanism included in a gear type transmission mechanism for a robot, and a robot provided with the gear mechanism.

BACKGROUND ART

Known robots, such as disclosed in JP 8-47878 A and JP 2002-172572 A, transmit the power of a driving source to a robot arm by a gear type transmission mechanism, namely, a gear train. The gear type transmission mechanism of a robot of this kind includes a gear mechanism. The gear mechanism includes gears and a support member rotatably supporting the gears.

FIG. 18 is a schematic plan view of a known gear mechanism 2 having three meshed gears 3a, 3b and 3c. FIG. 19 is a sectional view taken on the line S1-S1 in FIG. 18. The gear mechanism 2 has the two stationary gears 3a and 3b, and an idle gear 3c. The two stationary gears 3a and 3c are spaced apart and rotatably supported on a base body member 7. The idle gear 3c is rotatably supported on a support member 6. The idle gear 3c can be moved in an engaging direction toward the stationary gears 3a and 3c and can be moved in a disengaging direction away from the stationary gears 3a and 3b.

The support member 6 is fastened to the base body member 7 with a bolt 8. The bolt 8 is screwed in a threaded hole formed in the base body member 7. The bolt 8 screwed in the threaded hole of the base body member 7 moves in an axial direction 9 to press the support member 6 against the base body member 7. When the bolt 8 is unscrewed, the bolt 8 moves away from the base body member 7 to remove pressure applied to the support member 6. When the support member 6 is fastened to the base body member 7, the support member 6 is restrained from moving in either of the directions 10a and 10b by a frictional resistance. When the support member 6 is unfastened, the support member 6 is allowed to move either of the directions 10a and 10b.

The operator unfastens the bolt 8, moves the support member 6 in either of the directions 10 to adjust the position of the idle gear 3c relative to the stationary gears 3a and 3b. Then, the operator fastens the bolt 8 to press the support member 6 against the base body member 7. Thus the idle gear 3c is kept in a correct positional relation with the stationary gears 3a and 3b.

After the bolt 8 has been fastened, a frictional resistance restrains the support member 6 from movement in the directions 10a and 10b. If a force exceeding the frictional resistance acts on the support member 6, the support member 6 is moved in the direction 10a or 10b and, consequently, the idle gear 3c is displaced from a correct position.

Even if the frictional resistance acting on the support member 6 is very large, impact forces often exceed the frictional resistance. For example, an impact force, which is exerted on the stationary gear 3b when the robot arm collides against an obstacle, causes the instantaneous angular displacement of the stationary gear 3b. Consequently, an impact force exceeding the frictional resistance acts instantaneously through the idle gear 3c on the support member 6 to move the support member 6 in the direction 10b. If the idle gear 3c is thus dislocated from the correct position due to the displacement of the support member 6 in the direction 10b, the position of the robot arm cannot be accurately controlled.

Such a problem also arises in machines other than robots having a gear train. The conventional gear train restrains the displacement of the support member by the frictional resistance. Therefore, if a force exceeding the frictional resistance acts on the support member, the center distance between the meshed gears changes and the gears cannot be kept at the desired center distance from each other.

DISCLOSURE OF THE INVENTION

Accordingly, it is an object of the present invention to provide a gear mechanism capable of adjusting the center distance between meshed gears and of maintaining a desired center distance between the meshed gears even if an impact force is exerted on the gears.

The present invention provides a gear mechanism including: a base body member; a first gear supported on the base body member so as to rotate about a first axis of rotation; a second gear capable of being meshed with the first gear; a support member supporting the second gear so as to rotate about a second axis of rotation and placed on the base body member so as to be movable in approaching and leaving directions respectively toward and away from the first axis of rotation; and a retaining member engaged in a threaded hole formed in the base body member so as to be capable of being turned to move forward and backward in the approaching and leaving directions, the retaining member directly or indirectly supporting the support member to restrain the support member from moving in the leaving direction away the first axis of rotation.

According to the present invention, the position of the support member can be adjusted by moving the support member in the approaching and leaving directions after releasing the support member from the retaining member by turning the retaining member so as to move in the leaving direction. The support member is moved in either of the approaching and leaving directions to adjust the center distance between the two gears to a desired distance. Then, the retaining member is turned so as to move in the approaching direction to retain the support member at the desired position by the retaining member.

The retaining member retaining the support member is provided with an external screw thread that engages with an internal screw thread formed in the base body member. Thus the support member will not move relative to the base body member even if an impact force acts on the support member in the leaving direction. Therefore, the retaining member retains the support member at the desired position to prevent the displacement of the support member in the leaving direction with reliability even if the first gear applies an impact force through the second gear to the support member.

Most impact forces applied to the support member act to move the support member in the leaving direction. Therefore, the retaining member can bear most impact forces acting on the support member and can satisfactorily restrain the support member from undesired displacement.

Preferably, the gear mechanism according to the present invention further includes a support member fastening member configured to fasten the support member to the base body member, the support member fastening member in an unfastened state allowing the support member to move in the approaching and leaving directions relative to the base body member and in a fastened state restraining the support member from moving relative to the base body member by means of a frictional resistance.

The position of the support member is adjusted after unfastening the support member fastening member and the support member can be temporarily fastened to the base body member by fastening the support member fastening member. The support member can be restrained from displacement from the desired position by bringing the retaining member into contact with the temporarily fastened support member.

A force acting on the support member in directions other than the leaving direction is low so that the support member fastening member can satisfactorily restrain the support member from displacement by forces acting on the support member in the directions other than the leaving direction. Therefore, the center distance between the two gears can be surely kept at the desired distance by fastening the support member to the base body member and retaining the support member by the retaining member.

Preferably, the gear mechanism according to the present invention further includes a contact member configured to be able to move in the approaching and leaving directions and be brought into contact with the support member. The retaining member supports the support member via the contact member.

Since the retaining member retains the support member via the contact member, the retaining member does not come into direct contact with the support member. The retaining member does not rub the support member, and the displacement of the support member from the desired position can be prevented. Moreover, the support member will not be abraded. Since the contact member is an individual member separate from the retaining member, the contact member can be formed in a shape suitable for contact with the support member more easily than the retaining member.

Preferably, in the gear mechanism according to the present invention, the contact member and the support member are come into contact with each other in a state that the contact member is fitted in the support member or the support member is fitted in the contact member.

Thus the contact member and the support member can be surely prevented from displacement relative to each other even if an impact force acts on the support member in contact with the contact member.

Preferably, the gear mechanism according to the present invention further includes a contact member fastening member for mounting the contact member on the base body member, the contact member fastening member in an unfastened state allowing the contact member to move in the approaching and leaving directions relative to the base body member and in a fastened state restraining the contact member from moving relative to the base body member by means of a frictional resistance.

The contact member can be temporarily fastened to the base body member by setting the contact member fastening member in the unfastened state, positioning the contact member, and then setting the contact member fastening member in the fastened state. Temporary fastening of the contact member facilitates bringing the retaining member into contact with the contact member. Thus the contact member can be prevented from coming off the base body member. The displacement of the contact member relative to the base body member can be prevented and the dislocation of the support member from the desired position can be surely prevented by fastening the contact member in place after bringing the contact member into contact with the support member.

Preferably, in the gear mechanism according to the present invention, a contact member holding space for holding the contact member therein is formed in the base body member, a gap is formed between a side surface of the contact member holding space and a side surface of the contact member in the approaching and leaving directions, and a gap is scarcely formed between the side surface of the contact member holding space and the side surface of the contact member in a widthwise direction perpendicular to the approaching and leaving directions and to the second axis of rotation.

The side surface of the contact member holding space guides the contact member for movement in the approaching and leaving directions and restrains the contact member from movement in the widthwise direction.

Preferably, in the gear mechanism according to the present invention, the contact member fastening member is disposed on one side with respect to an imaginary plane containing the second axis of rotation and parallel to the approaching and leaving directions so that the contact member fastening member supports the contact member so as to be able to turn about the contact member fastening member in an unfastened state. The retaining member is disposed on an other side with respect to the imaginary plane so as to support the contact member by a part of the contact member lying on the other side of the imaginary plane.

The contact member fastening member allows the contact member to turn in the unfastened state and restrains the contact member from turning in the fastened state.

Preferably, in the gear mechanism according to the present invention, the retaining member comprises a plurality of retaining members disposed on both sides, respectively, of an imaginary plane containing the second axis of rotation and parallel to the approaching and leaving directions.

The plurality of retaining members disposed on both the sides, respectively, of the imaginary plane bear a force exerted on the support member. An impact force applied by the first gear via the second gear to the support member acts along the imaginary plane. The plurality of retaining members thus disposed bear the impact force. Consequently, the contact member is restrained from angular displacement and the support member can be stably supported.

Preferably, in the gear mechanism according to the present invention, the support member is a gear box rotatably supporting a plurality of gears including the second gear.

A robot according to the present invention includes: a robot arm; and driving means configured to drive the robot arm for displacement. The driving means has a transmission mechanism including any one of the gear mechanism mentioned above, the transmission mechanism transmitting a power from a driving source to the robot arm to drive the robot arm for displacement.

In the robot according to the present invention, the power of the driving source is transmitted to the robot arm by the gears. Sometimes the robot arm collides against an obstacle due to operator's erroneous operation. When the robot arm collides against an obstacle, an impact force is transmitted from the first gear through the second gear to the support member. The robot provided with the gear mechanism can prevent increase in the center distance between the gears beyond the desired distance. Therefore, backlashes between the teeth of the meshed gears do not need to be adjusted every time the robot arm collides against an obstacle and the robot can move accurately. Maintenance work necessary when the gears are dislocated can be omitted.

In the gear mechanism according to the present invention, the position of the support member with respect to the approaching and leaving directions is adjustable, and the retaining member restrains the support member from undesired displacement in the leaving direction away from the first axis. The center distance between the two gears can be adjusted to a desired distance, and an increase in the center distance adjusted to the desired distance can be surely prevented. Thus the support member will not be dislocated even if an impact force acts on the support member and the center distance can be kept unchanged. Therefore, the readjustment of the center distance, which is necessary when the support member is dislocated, is unnecessary. Thus time for maintenance can be reduced.

Keeping the desired center distance between the gears improves convenience. If the center distance is adjusted such that the backlash between the teeth of the two gears is zero, the backlash remains zero even if an impact force is applied to the support member and hence the two meshed gears can accurately rotate.

The retaining member supports the support member which is temporarily fastened by the support member fastening member, thereby, the dislocation of the support member from a correct position can be prevented when the support member is fastened to the base body member. The use of the support member fastening member in combination with the retaining member restrains the support member from dislocation in the leaving direction and in directions other than the leaving direction. Thus the center distance between the two gears can be surely kept at the desired distance.

The retaining member retains the support member via the contact member. Therefore, the retaining member does not come into direct contact with the support member, the contact member is pressed against the support member and the dislocation of the support member from the desired position can be surely prevented. Since the contact member is an individual member separate from the retaining member, the contact member can be formed in a shape that makes the contact member come into contact with the support member more easily than the retaining member. Consequently, the support member can be stably supported.

When the contact member is brought into contact with the support member, the contact member is fitted in the support member or the support member is fitted in the contact member. Therefore, the dislocation of the support member can be surely prevented even if an impact force acts on the support member.

Convenience can be improved by bringing the retaining member into contact with the contact member which is temporarily fastened by the contact member fastening member. For example, the displacement of the contact member relative to the base body member can be prevented by fastening the contact member.

The contact member is held in the contact member holding space formed in the base body member, and the side surface of the contact member holding space guides the contact member for movement in the approaching and leaving directions and limits the widthwise movement of the contact member. Thus the contact member can be smoothly positioned and the widthwise displacement of the contact member can be surely prevented.

When the contact member can turn in a state where the contact member fastening member is unfastened and can not turn in a state where the contact member fastening member is fastened, operations for positioning and fastening the contact ember can be easily achieved.

When the retaining members are disposed on both the sides of an imaginary plane containing the second axis of rotation and parallel to the approaching and leaving directions, respectively, the angular displacement of the contact member can be prevented even if an impact force is applied through the first and second gears to the support member. Thus the support member can be surely held at the desired position.

Even if the robot arm of the robot according to the present invention collides against an obstacle, any work for adjusting the backlashes between teeth of the meshed gears is unnecessary, the accuracy of motions of the robot can be insured and the robot operates efficiently. Thus, for example, the yield of products manufactured by the operation of the robot can be improved. Maintenance work necessary when the gears are dislocated can be omitted and the efficiency of production can be improved.

BEST MODE FOR CARRYING OUT THE INVENTION

Figure 1:
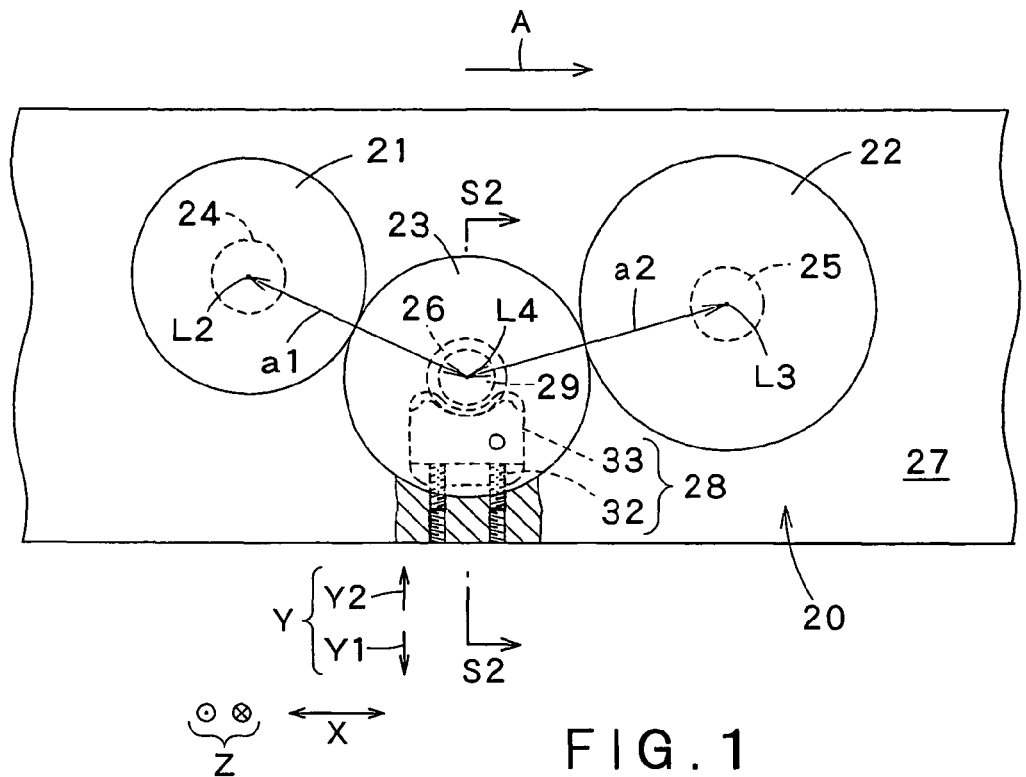
FIG. 1 is a schematic plan view of a gear mechanism 20 in an embodiment according to the present invention, in which three meshed gears 21, 22 and 23 are shown.

Referring to FIG. 1, a gear mechanism in an embodiment according to the present invention includes at least two gears, namely, gears 21, 22 and 23, bearings 24 and 25 rotatably supporting the gears 21 and 22, and a support member 26 supporting the gear 23.

The gears 21 to 23 are directly or indirectly supported on a base body member 27 and are arranged in a predetermined gear arranging direction A. The gears are meshed. A driving force is transmitted from the gear on one side of the arrangement with respect to the gear arranging direction A to the gear on the other side of the arrangement with respect to the gear arranging direction A. In the arrangement of the spur gears 21 to 23 in this embodiment, the rotation of the gear 21 on one side of the arrangement with respect to the gear arranging direction A is transmitted through the middle gear 23 to the gear 22 on the other side of the arrangement with respect to the gear arranging direction A to rotate the gear 22. The term 'rotation' as used in this specification signifies turning many full turns and also an angular displacement below one full turn.

In the gear mechanism 20, center distances a1 and a2 respectively between the gears 21 and 23 and between the gears 22 and 23 are adjustable, and the gears can be held at the adjusted center distances a1 and a2. The center distances a1 and a2 are the distance between the respective axes of the meshed gears 21 and 23 and the meshed gears 22 and 23, respectively.

The gear mechanism 20 includes the base body member 27, the stationary gears 21 and 22, the idle gear 23, the support member 26, a retaining mechanism 28 and a first bolt 29. The two stationary gears 21 and 22 are first gears. The stationary gears 21 and 22 are not meshed.

The stationary gears 21 and 22 are directly or indirectly connected to the base body member 27. The stationary gears 21 and 22 are supported rotatably on the base body member 27 and are restrained from sliding displacement. In this embodiment, the stationary gears 21 and 22 are rotatably supported in bearings 24 and 25 fixedly attached to the base body member 27.

The idle gear 23 is a second gear. The idle gear 23 is rotatably supported directly or indirectly on the support member 26. The support member 26 can be moved in approaching and leaving directions Y, namely, an approaching direction Y2 in which the support member 26 moves toward the respective axes L2 and L3 of rotation of the stationary gears 21 and 22 and a leaving direction Y1 in which the support member 26 moves away from the axes L2 and L3 of rotation. The idle gear 23 is rotatably supported on the support member 26 and can slide on the base body member 27. The leaving direction Y1 and the approaching direction Y2 are opposite to each other.

Figure 2:
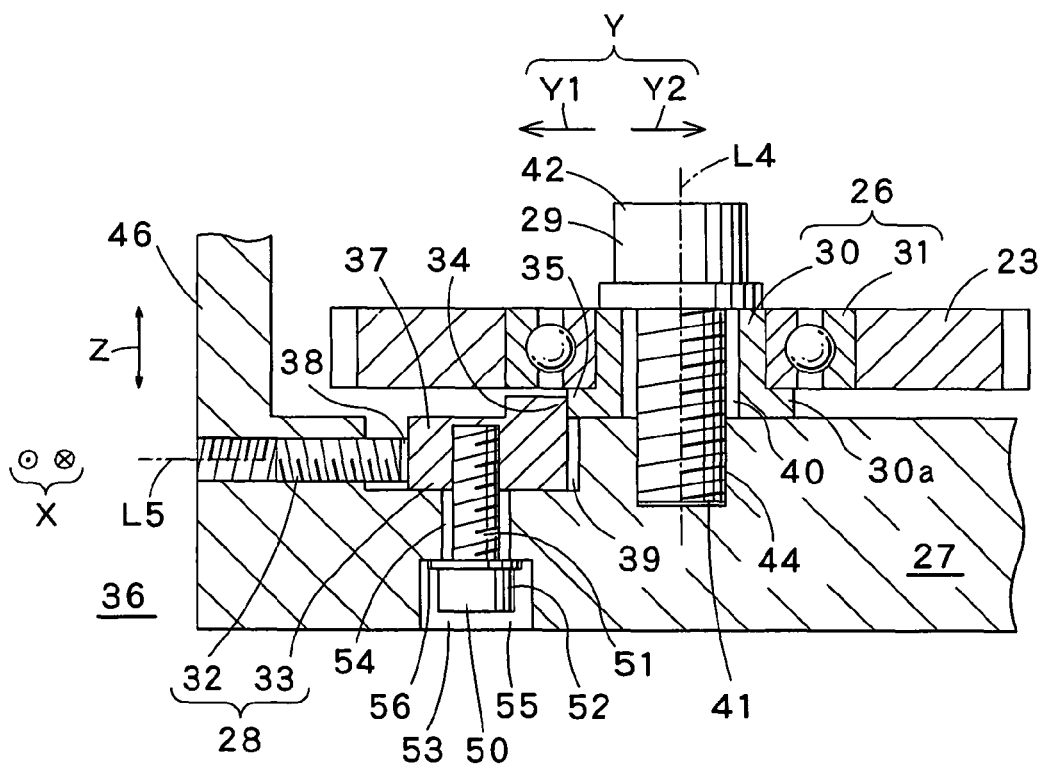
FIG. 2 is a sectional view taken on the line S2-S2 in FIG. 1.

Referring to FIG. 2, the support member 26 includes a base part 30 and a rotary member 31. The base part 30 is substantially cylindrical. The base part 30 has one axial end 30a provided with a flange 35. The flange 35 extends radially outward from the axial end 30a so as to extend around an axis L4. The base part 30 has the shape of a flanged pipe. The axial end 30a of the base part 30 is in contact with the base body member 27.

The rotary member 31 is cylindrical. The rotary member 31 is put on a boss of the base part 30 and is seated on the flange 35. The side surface of the flange 35 of the support member 26 is exposed outside. The rotary member 31 has an outer part that rotates relative to the base part 30. The rotary member 31 is, for example, a bearing structure.

The idle gear 23 has the shape of a ring. The rotary member 31 is fixedly fitted in the center hole of the idle gear 23. Thus the idle gear 23 can rotate relative to the base part 30 of the support member 26. The idle gear 23, the rotary member 31 and the base part 30 are coaxial. The axis L4 is the common axis of the idle gear 23 and the support member 26.

The retaining mechanism 28 includes retaining members 32 and a contact member 33. Each of each retaining members 32 is engaged in a threaded hole formed in the base body member 27. Each retaining member 32 can be screwed so as to move in the approaching and leaving directions Y. Each retaining member 32 is brought into direct or indirect contact with the support member 26 by screwing the same so as to move in the approaching direction Y2 to restrain the support member 26 from movement in the leaving direction Y1. In this embodiment, each retaining member 32 retains the support member 26 through the contact member 33. The contact member 33 is in contact with the support member 26.

The first bolt 29 is a support member fastening member for fastening the support member 26 in place. The first bolt 29 fastens the support member 26 detachably to the base body member 27. The first bolt 29 is screwed into the base body member 27 to press the support member 26 in an axial direction Z against the base body member 27 for fastening. The first bolt 29 is screwed so as to move outward relative to the base body member 27 to remove pressure acting on the support member 26 for unfastening. The axial direction Z is parallel to the axis L4 of rotation of the idle gear 23.

The first bolt 29 has a shank 41 and a head 42. The shank 41 is cylindrical and is provided with an external screw thread at least in one axial end part thereof. The head 42 is continuous with the other axial end part of the shank 41. The head 42 has an external dimension greater than the diameter of the shank 41. The first bolt 29 is, for example, a hexagon socket head bolt.

The base part 30 of the support member 26 is provided with a through hole 40 aligned with the axis L4. The through hole 40 has a diameter greater than that of the shank 4 of the first bolt 29 and smaller than that of the head 42 of the first bolt 29. When the shank 41 is inserted in the through hole 41 in alignment with the axis L4 of the base part 30, an annular space aligned with the axis L4 is formed between the first bolt 29 and the inside surface of the base part 30; that is, shank 41 is spaced from the inside surface of the base part 30 with respect to the approaching and leaving directions Y and widthwise directions X.

The base body member 27 is provided with a first threaded part 44 into which the shank 41 of the first blot 29 is screwed. The first threaded part 44 constitutes a first threaded hole into which the shank 41 of the first bolt 29 is screwed in the axial direction Z. The axis of the first threaded part 44 is aligned with the axis L4 of rotation of the idle gear 23 when the idle gear 23 is positioned at an expected position.

The first bolt 29 is inserted in the through hole 40 and is screwed into the first threaded part 44. As the first bolt 29 is screwed into the base body member 27, the head 42 comes into contact with the end surface of the base part 30. As the first bolt 29 is screwed further into the base body member 27, the distance in the axial direction Z between the head 42 and the base body member 27 decreases so that the support member 26 is pressed against the base body member 27. A state where the first bolt 29 presses the support member 26 in the axial direction Z will be called a fastened state. In the fastened state, frictional resistance exerted on the support member 26 by the base body member 27 prevents the displacement of the support member 26.

When the first bolt 29 is screwed away from the base body member 27, the head 42 separates from the base part 30 of the support member 26. A state where the head 42 of the first bolt 29 is separated from the base part 30 is called an unfastened state. In the unfastened state, frictional resistance is exerted scarcely on the support member 26 by the base body member 27 and the support member 26 is allowed to move in the approaching and leaving directions Y.

The contact member 33 of the retaining mechanism 28 is kept in contact with the support member 26 to restrain the support member 26 from movement in the leaving direction Y1. Each retaining member 32 is screwed in a threaded hole formed in the base body member 27. The contact member 33 has a first contact part 34 on the side of the support member 26. The first contact part 34 of the contact member 33 is in contact with the side surface of the flange 35. Thus the contact member 33 comes into contact with the support member 26 from a side opposite the side on which the axes L2 and L3 of rotation lie. The contact member 33 has a second contact part 37 in contact with the inner end 38 of each retaining member 32.

The contact member 33 is fitted in a containing containing space 39 formed in the base body member 27. The containing containing space 39 is formed in a size larger than that of the contact member 33 to allow the contact member 33 to move in the approaching and leaving directions Y. In this embodiment, the containing containing space 39 is formed such that a space is formed between inner end surface of the containing containing space 39 with respect to the approaching and leaving directions Y and the inner end of the contact member 33 and a space is formed scarcely with respect to the widthwise direction X between the each of the side surfaces of the contact member 33 and the corresponding side surface of the containing containing space 39. Thus the contact member 33 can be prevented from displacement in the widthwise direction X and can be guided for movement in the approaching and leaving directions Y.

Each retaining member 32 is provided with an external screw thread. For example, each retaining member 32 is a stop screw. Each retaining member 32 has an axis L5 substantially parallel to the approaching and leaving directions Y. Each retaining member 32 is screwed in a second threaded part 46 formed in the base body member 27. The second threaded part 46 constitutes a second threaded hole in which each retaining member 32 is screwed in the approaching and leaving directions Y. The second threaded hole connects the containing space 39 to an outside space 36 surrounding the base body member 27.

Each retaining member 32 is turned about an axis L5 to screw each retaining member 32 in the approaching and leaving directions Y. Each retaining member 32 is screwed so as to move in the approaching direction Y2 to move each retaining member 32 from the second threaded hole into the containing space 39 and to move each retaining member 32 in the approaching direction Y2 in the containing space 39. Consequently, each retaining member 32 is brought into contact in the approaching direction Y2 with the contact member 33 held in the containing space 39. This embodiment is provided with the two retaining members 32. The two retaining members 32 are disposed on the opposite sides with respect to the widthwise direction X, respectively, of an imaginary plane containing the axis L4 of rotation of the idle gear 26 and parallel to the approaching and leaving directions Y. For example, the two retaining members are arranged in the widthwise direction X symmetrically with respect to the imaginary plane.

The gear mechanism 20 further includes a second bolt 50. The second bolt 50 is a retaining member fastening member for fastening the contact member 33 to the base body member 27. The second bolt 50 detachably fastens the contact member 33 to the base body member 27. The second bolt 50 prevents the contact member 33 from falling off the base body member 27.

The second bolt 50 has a shank 51 and a head 52. The shank 51 is cylindrical and is provided with an external screw thread at least in one axial end part thereof. The head 52 is continuous with the other axial end part of the shank 51. The head 42 has an external dimension greater than the diameter of the shank 51. For example, the second bolt 50 is a hexagon head bolt.

The base body member 27 is provided with a counterbored hole 53 for receiving the second bolt 50. The counterbored hole 53 is a through hole penetrating the base body member 27 in the axial direction Z. The counterbored hole 53 has a first part 54 and a second part 55. The first part 54 has a diameter greater than that of the shank 51 of the second bolt 50 and smaller than that of the head 52 of the second bolt 50. The second part 55 has a diameter greater than that of the head 52 of the second bolt 50. The first part 54 and the second part 55 are continuous in the axial direction Z. The first part 54 is formed contiguously with the contact member 33.

The shank 51 of the second bolt 50 is inserted in the first part 54 and the head 52 is seated on the bottom of the second part 55. A space is formed between the shank 51 and the side surface of the first part 54 in the approaching and leaving directions Y. A space is formed between the head 52 and the side surface of the second part 55 in the approaching and leaving directions Y. Since the spaces are formed in the approaching and leaving directions Y between the second bolt 50 and the base body member 27, the second bolt 50 can move in the approaching and leaving directions Y together with the contact member 33.

The shank 51 of the second bolt 560 inserted into the first part 44 is screwed in the contact member 33. When the second bolt 50 is screwed deep into the contact member 33, the head 52 comes into contact with the base body member 27. The head 52 is seated on the bottom 56 of the second part 55. As the second bolt 50 is screwed further into the contact member 33, the distance in the axial direction Z between the head 42 and the base body member 27 decreases so that the contact member 33 is pressed against the base body member 27. A state when the second bolt 50 presses the contact member 33 against the base body member 27 will be called a fastened state. In the fastened state, a frictional resistance exerted on the contact member 33 by the base body member 27 prevents the displacement of the contact member 33.

Figure 3:
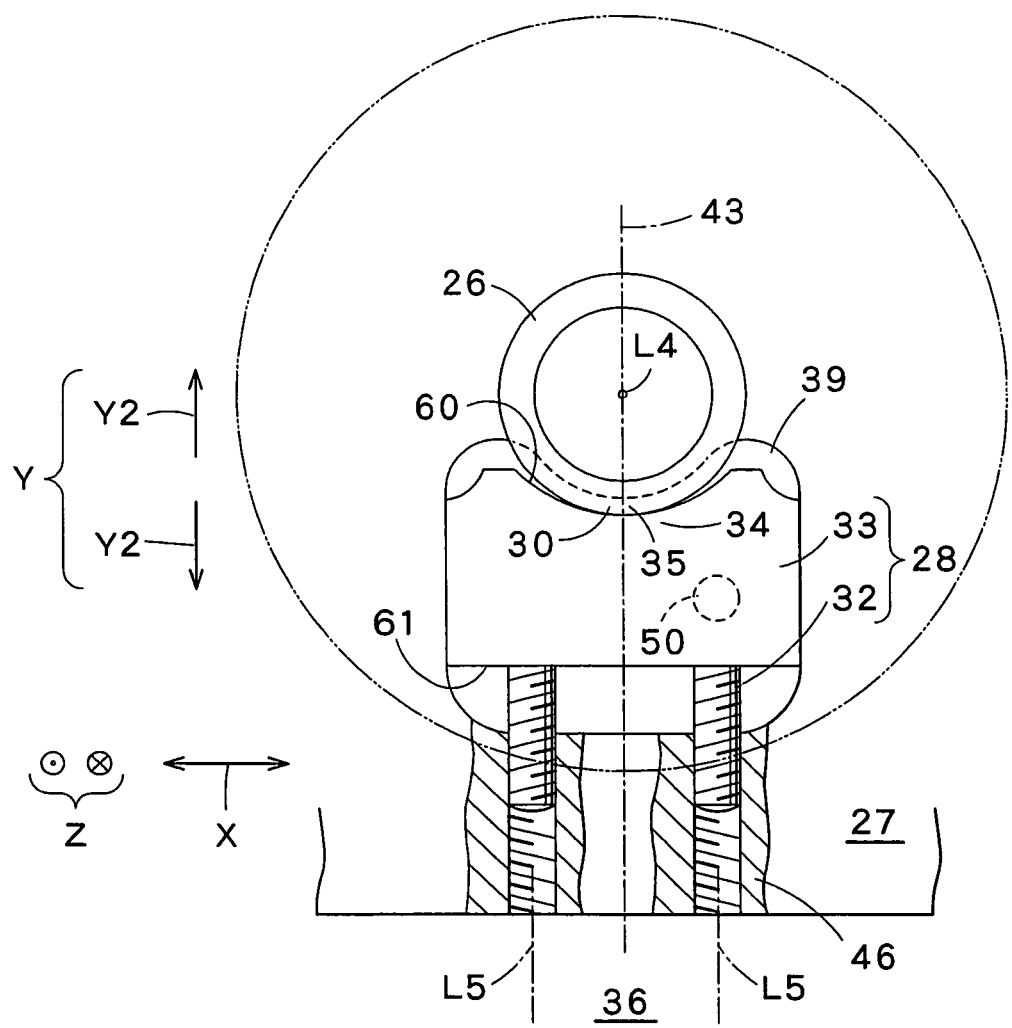
FIG. 3 is a partly cutaway plan view of the gear mechanism 20.

When the second bolt 50 is turned so as to move away from the contact member 33, the head 52 separates from the base body member 27. A state where the head 52 of the second bolt 50 is separated from the base body member 27 will be called an unfastened state. In the unfastened state, the a frictional resistance is exerted scarcely on the contact member 33 by the base body member 27 and the contact member 33 is allowed to move in the approaching and leaving directions Y Referring to FIG. 3, the first contact part 34 of the connect member 33 has a curved surface of a shape conforming to the external shape of the flange 35 of the base part 30. In this embodiment, the flange 35 has a circular section perpendicular to the axis L4 of the base part 30. The first contact part 34 of the contact member 33 has a first contact surface 60 inclined toward the leaving direction Y1 with respect to directions toward an imaginary plane 43 from the widthwise directions. In this embodiment, the first contact surface 60 has a curvature slightly greater than that of the circular section of the flange 35. The second contact part 37 of the contact member 33 has a second contact surface 61 perpendicular to the imaginary plane 43. The second contact surface 61 is perpendicular to the respective axes L5 of the retaining members 32 of the retaining mechanism 28. According to the present invention, the curvature of the first contact surface 60 may also be equal to or slightly smaller than that of the flange 35.

Figure 4:
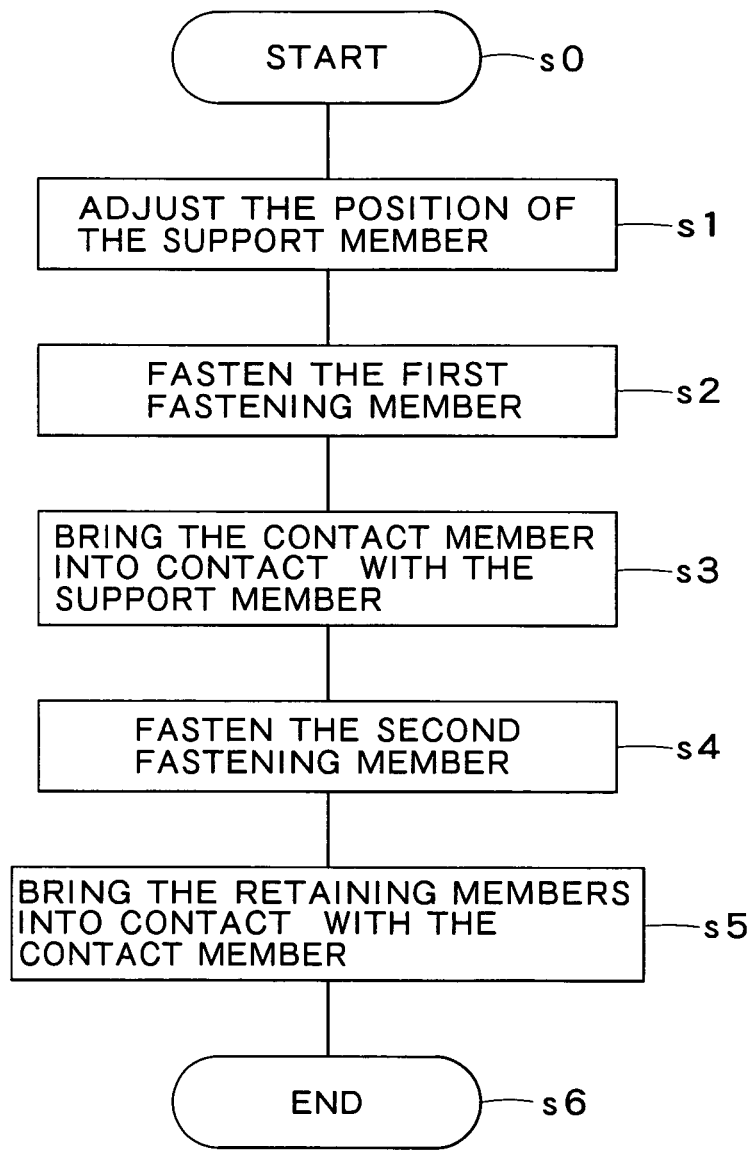
FIG. 4 is a flow chart of a center distance adjusting procedure for adjusting the center distance between gears.
Figure 5A:
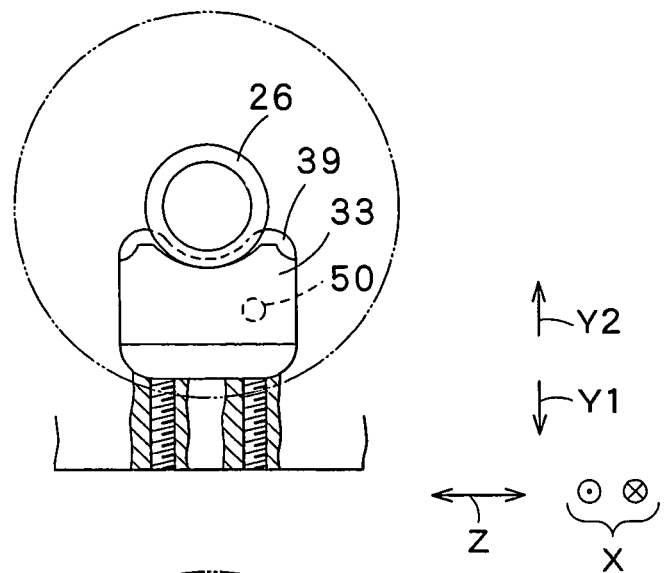
FIG. 5A is a view of assistance in explaining the center distance adjusting procedure.
Figure 5B:
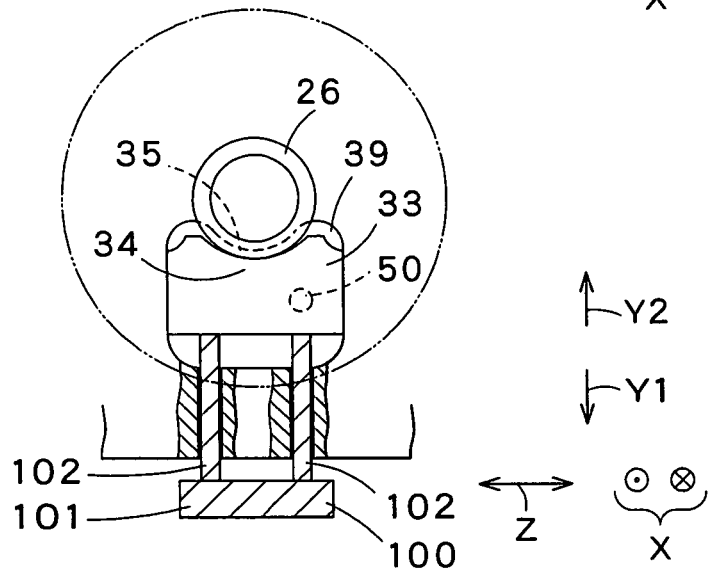
FIG. 5B is a view of assistance in explaining the center distance adjusting procedure.
Figure 5C:
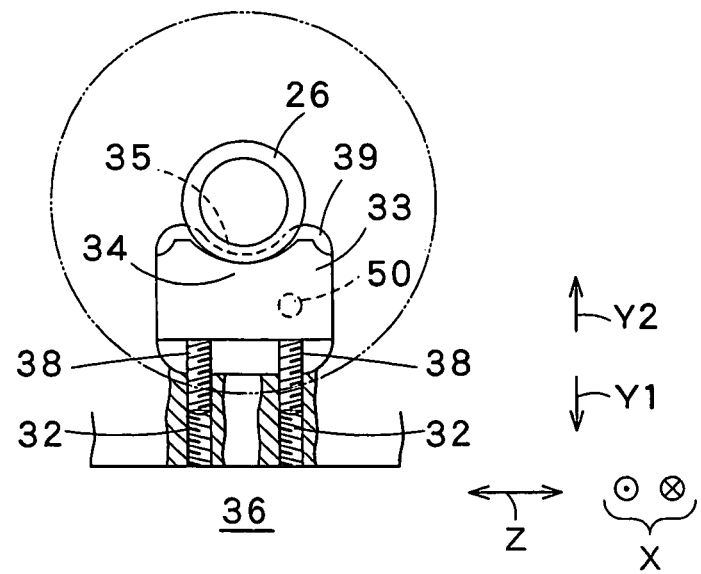
FIG. 5C is a view of assistance in explaining the center distance adjusting procedure.

A center distance adjusting procedure will be described with reference to FIGS. 4 to 5C.

In the gear mechanism 20, the center distances between the stationary gear 21 and the idle gear 23 and between the stationary gear 22 and the idle gear 23 are adjustable and the adjusted center distances can be maintained. In step s0, the center distance adjusting procedure is started when the adjustment of the center distances between the stationary gear 21 and the idle gear 23 and between the stationary gear 22 and the idle gear 23 needed and step s1 is executed.

In step s1, the first bolt 29 is unfastened to allow the support member 26 to move. Then, as shown in FIG. 5A, the position of the support member 26 is adjusted so that the idle gear 23 are positioned at desired center distances from the stationary gears 21 and 22. For example, the support member 26 is moved to reduce backlashes between the teeth of the idle gear 23 and those of the stationary gears 21 and 22 to zero or to substantially zero. After the position of the support member has been thus adjusted, step s2 is executed.

In step s2, the first bolt 29 is fastened. The first bolt 29 is screwed into the base body member 27 to fasten the support member 26 to the base body member 27 by pressing the base part 30 of the support member 26 against the base body member 27. Then, step s3 is executed.

In step s3, the contact member 33 is brought into contact with the support member 26 by using a pressing tool 100. The pressing jig 100 has a base 101 and two projections 102 projecting from the base 101. The two projections 102 are parallel, extend in the same direction from the base 101 and have the same length. The two projections 102 can be inserted into the second threaded holes.

The two projections 102 of the pressing tool 100 are inserted into the second threaded holes, respectively, and are brought into contact with the contact member 33. Then, the pressing jig 100 is moved in the approaching direction Y2 to bring the first contact part 34 of the contact member 33 into contact with the flange 35 of the support member 26 as shown in FIG. 5B. Then step s4 is executed.

In step s4, the second bolt 50 is fastened. The contact member 33 is fastened to the base body member 27 by screwing the second bolt 50 into the contact member 3 to press the contact member 33 against the base body member 27. Then step s5 is executed.

In step s5, the pressing tool 100 is removed from the base body member 27 and the retaining members 32 are screwed into the second threaded parts 46. Then, the retaining members 32 are screwed so as to move in the approaching direction Y2 to bring the inner ends 48 of the retaining members 32 into contact with the second contact part 37 of the contact member 33 as shown in FIG. 5C. Thus the retaining members 32 screwed into the base body member 27 and the contact member 32 and the support member 26 are arranged contiguously in the approaching and leaving directions. Then, the center distance adjusting procedure is ended in step s6.

In the gear mechanism 20 in this embodiment, the center distances between the idle gear 23, namely, a second gear, and the stationary gear 21, namely, a first gear, and between the idle gear 23 and the stationary gear 22, namely, a first gear, can be adjusted by screwing the first bolt 29, the second bolt 50 and the retaining members 32. The adjusted center distances can be maintained by screwing the first bolt 29, the second bolt 50 and the retaining members 32.

In a state where the center distances are fixed, the threaded retaining members 32 are engaged in the threaded holes of the base body member 27. Therefore, the retaining members 32 will not be displaced relative to the base body member 27 even if an impact force acts on the retaining members 32 in the leaving direction Y1. Thus the displacement of the support member 26 retained via the contact member 33 by the retaining members 32 can be surely prevented even if an impact force is applied through the idle gear 23 to the support member 26 by the stationary gears 21 and 22.

Most impact forces exerted on the support member 26 act in the leaving direction Y1. Therefore, most impact forces exerted on the support member 26 can be born by the retaining members 32 and hence the undesired displacement of the support member 26 can be satisfactorily prevented.

The support member 26 can be temporarily fixed to the base body member 27 by unfastening the first bolt 29, positioning the support member 26, and then fastening the first bolt 29. The dislocation of the support member 26 from the desired position can be prevented by bringing the contact member 33 into contact with the support member 26 after temporarily fixing the support member 26.

Forces exerted on the support member 26 other than the force acting in the leaving direction Y1 are low. The first bolt 29 can satisfactorily prevent the displacement of the support member 26 by those forces other than the force acting in the leaving direction Y1. Therefore, the desired center distance between the two gears can be surely maintained by keeping the contact member 33 in contact with the support member 26 by the retaining members 32 and fastening the support member 26 by the first bolt 29.

The retaining members 32 retain the support member 26 via the contact member 33 at the desired position. The retaining members 32 are not in direct contact with the support member 26 and the contact member 33 can be brought into contact with the support member 26. Thus the dislocation of the support member 26 from the desired position can be prevented. Since the contact member 33 is an individual member separate from the retaining members 32, the contact member 33 can be formed in a shape suitable for contact with the support member 26 more easily than the retaining members 32.

When the contact member 33 is brought into contact with the support member 26, the flange 35 of the support member 26 is fitted in the first contact part 34 of the contact member 33. Thus the dislocation of the support member 26 and the contact member 33 relative to each other can be surely prevented even if an impact force is applied to the support member 26.

The two retaining members 32 disposed on the opposite sides, respectively, of the imaginary plane 43 bear the force exerted on the support member 26. The impact force exerted via the idle gear 23 on the support member 26 by the stationary gears 21 and 22 acts along the imaginary plane 43. Even if such an impact force is exerted on the support member 26, the angular displacement of the contact member 33 can be prevented and the contact member 33 can be stably held in place because the two retaining members 32 bear the impact force.

The contact member 33 can be temporarily fixed to the base body member 27 by unfastening the second bolt 50, positioning the contact member 33 and then fastening the second bolt 50. Convenience can be improved by bringing the retaining members 32 into contact with the temporarily fixed contact member 33. For example, the contact member 33 can be prevented from separating from the support member 26. The contact member 33 is prevented from dislocating relative to the base body member 26 by fastening the contact member 33 after bringing the contact member 33 into contact with the support member 26. Thus the dislocation of the support member 26 from the desired position can be surely prevented.

In this embodiment, an annular space is formed around the axis L4 of the base part 30 between the first bolt 29 and the inside surface of the base part 30. Therefore, the support member 26 can be moved relative to the first bolt 19 in the approaching and leaving directions Y and the widthwise directions X. Therefore, normal backlashes and circumferential backlashes can be adjusted. The support member 26 and the idle gear 23 can be removed from the base body member 27 by removing the first bolt 29 from the base body member 27, which improves convenience. The contact between the rotary member 31 and the contact member 33 can be avoided by bringing the contact member 33 into contact with the flange 35 of the base part 30 of the support member 26. The first contact surface 60 has the curvature slightly greater than that of the side surface of the flange 35. Thus a position where the contact member 33 is in contact with the support member 26 can be positioned as near to the imaginary plane 43 as possible and hence the contact member 33 can bear an impact force exerted on the support member 26. The contact member 33 can be surely kept in contact with the flange 35 even if the support member 26 is turned about the axis L4. The foregoing effect is effective even if the curvature of the first contact surface 60 is equal to or slightly smaller than that of the flange 35.

In this embodiment, the containing space 39 in which the contact member 33 is held lies beneath a plane containing the surface of the base body member 27 on which the support member 26 is disposed. Therefore, the surface of the base body member 27 in contact with the contact member 33 is sunk in the axial direction Z beneath a plane containing the surface of the base body member 27 in contact with the support member 26. Therefore, the contact member 33 will not interfere with the idle gear 23, the contact member 33 can be formed in a big thickness in the axial direction Z and hence the second bolt 50 can be screwed into the contact member 33.

Figure 6:
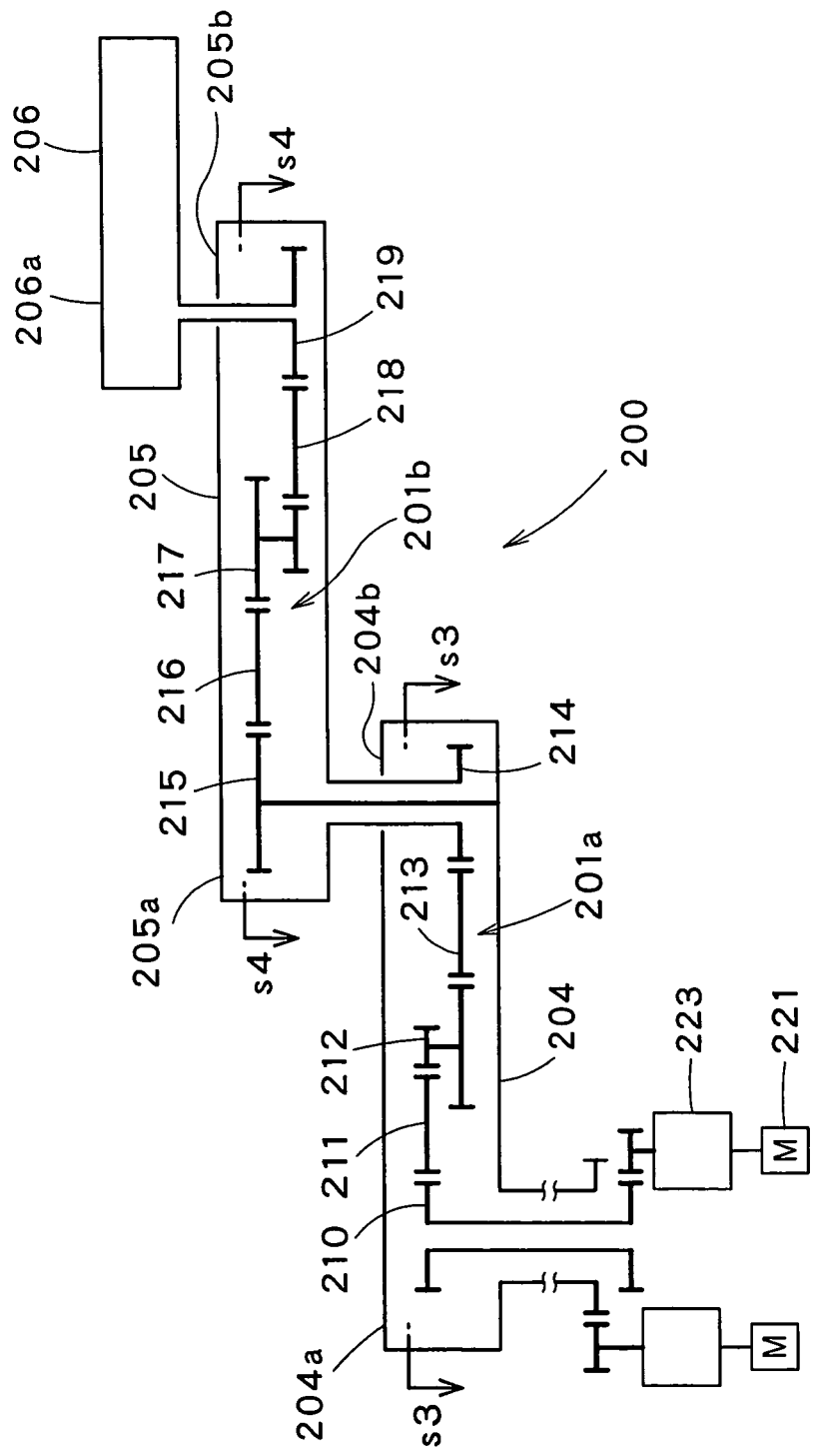
FIG. 6 is a schematic sectional view of a robot 200 provided with a gear mechanism of the present invention.

A robot 200 in a preferred embodiment according to the present invention will be described with reference to FIGS. 6 to 8. In the robot 200, power of a driving device is transmitted to robot arms by gear type transmission mechanisms, namely, gear trains. Robots of this type are used, for example, for carrying substrates, such as semiconductor wafers.

The robot 200 includes a first arm 204, a second arm 205, a third arm 206, a driving device 221, a reduction gear 223, a first gear type transmission mechanism 201a and a second gear type transmission mechanism 201b. The first arm 204 has a first longitudinal end part 204a connected to a base.

The second arm 205 has a first longitudinal end part 205a joined to a second longitudinal end part 204b of the first arm 204. The second arm 205 can turn on the first longitudinal end part 205a. The third arm 206 has a first longitudinal end part 206a joined to the second longitudinal end part 205b of the second arm 205. The third arm 206 can turn on the first longitudinal end part 206a.

The driving device 221 drives the second arm 205 and the third arm 206 interlocked with the second arm 205 for rotatory motions. The driving device 221 drives the second arm 205 for turning on its first longitudinal end part 205a and drives the third arm 206 for turning on its first longitudinal end part 206a.

The driving device 221 is mounted on the base of the robot 200. The power of the driving device 221 is transmitted to the second arm 205 by a first gear type transmission mechanism 201a to turn the second arm 205 relative to the first arm 204. The first gear type transmission mechanism 201a includes stationary gears and idle gears corresponding to those of the gear mechanism 20.

Figure 7:
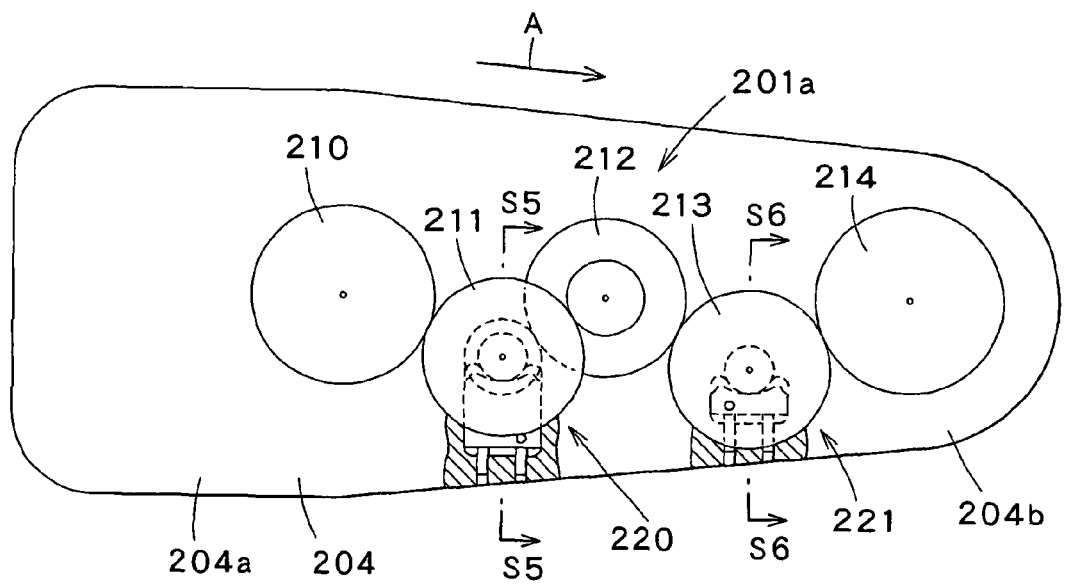
FIG. 7 is a sectional view taken on the line S3-S3 in FIG. 6.

Referring to FIG. 7, the first gear type transmission mechanism 201a has a gear train including stationary gears 210, 212 and 214 and idle gears 211 and 213. The stationary gears 210, 212 and 214 and the idle gears 211 and 213 are arranged alternately in a gear arranging direction A on the first arm 204. The adjacent gears of the gear train are meshed. Power is transmitted from the stationary gear 210 at a first end of the gear train with respect to the gear arranging direction A via the gears to the stationary gear 214 at a second end of the gear train with respect to the gear arranging direction A.

The stationary gear 214 at the second end of the gear train with respect to the gear arranging direction A is rotatably supported on the second longitudinal end part 204b of the first arm 204 and is fixed to the second arm 205. The second arm 205 can be turned relative to the first arm 204 by turning the stationary gear 214. The first gear type transmission mechanism 201a has a gear support member similar to that of the gear mechanism 20 for each of the idle gears 211 and 213. The center distances between the idle gear 211 and the stationary gears 210 and 212 and between the idle gear 213 and the stationary gears 212 and 214 are adjustable and the adjusted center distances can be maintained. Thus power can be transmitted from the gear 210 at the first end of the gear train with respect to the gear arranging direction A to the gear 214 at the second end of the gear train with respect to the gear arranging direction A through the gear train in which the gears are meshed without or substantially without any backlashes between the teeth of the meshed gears.

Similarly, the power of the driving device 221 is transmitted by the second gear type transmission mechanism 201b to turn the third arm 206 relative to the second arm 205. The second gear type transmission mechanism 202b includes stationary gears and idle gears corresponding to those of the gear mechanism 20.

Figure 8:
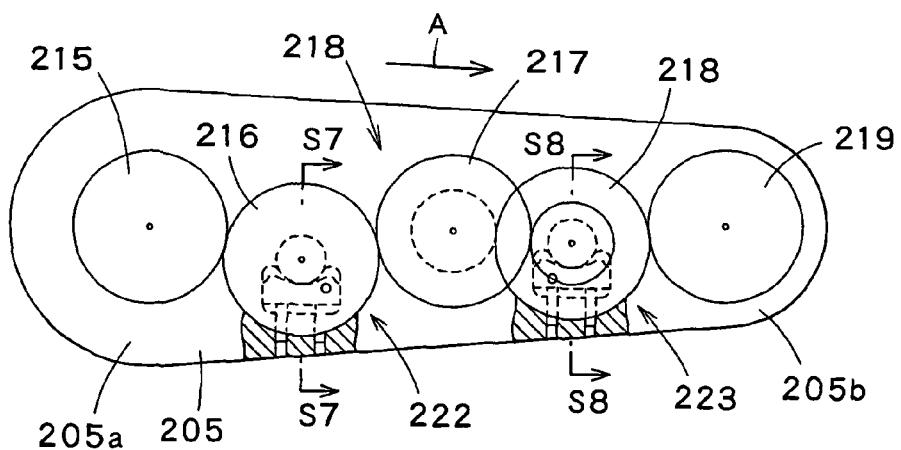
FIG. 8 is a sectional view taken on the line S4-S4 in FIG. 6.
Figure 9:
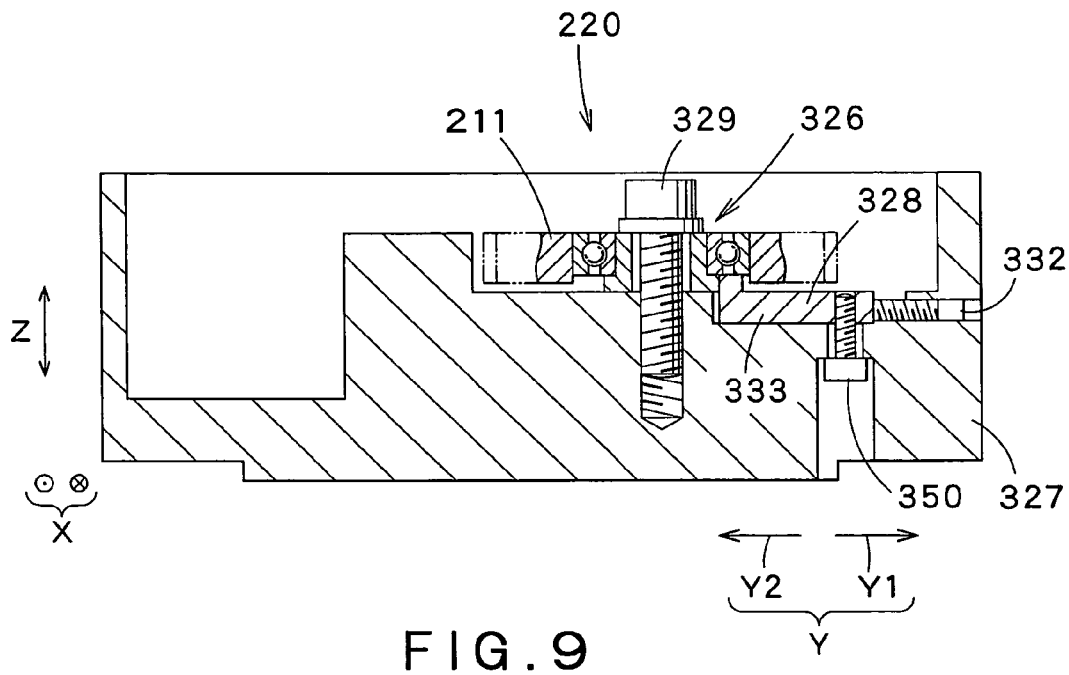
FIG. 9 is a sectional view taken on the line S5-S5 in FIG. 7.
Figure 10:
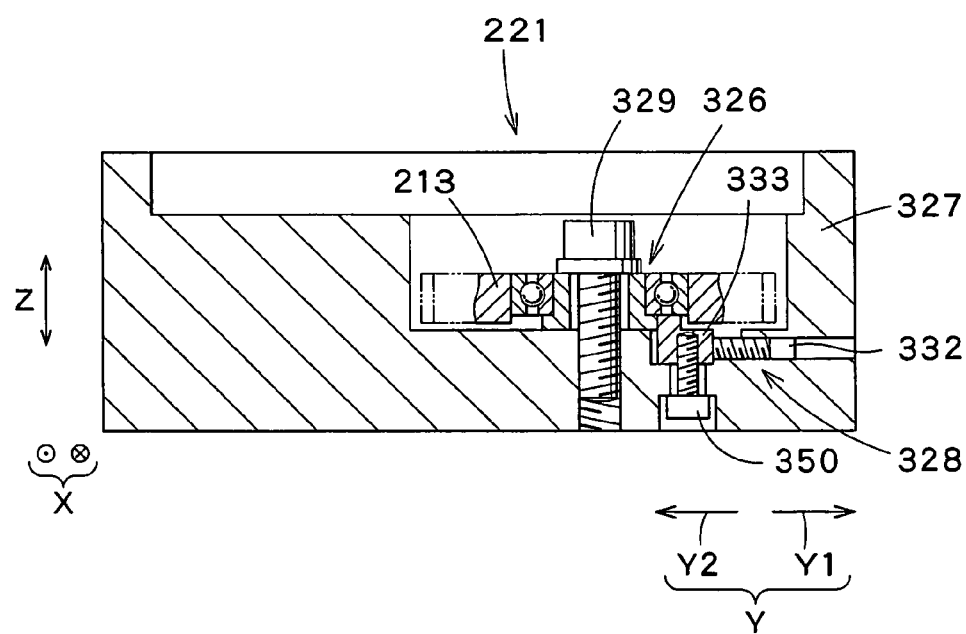
FIG. 10 is a sectional view taken on the line S6-S6 in FIG. 7.
Figure 11:
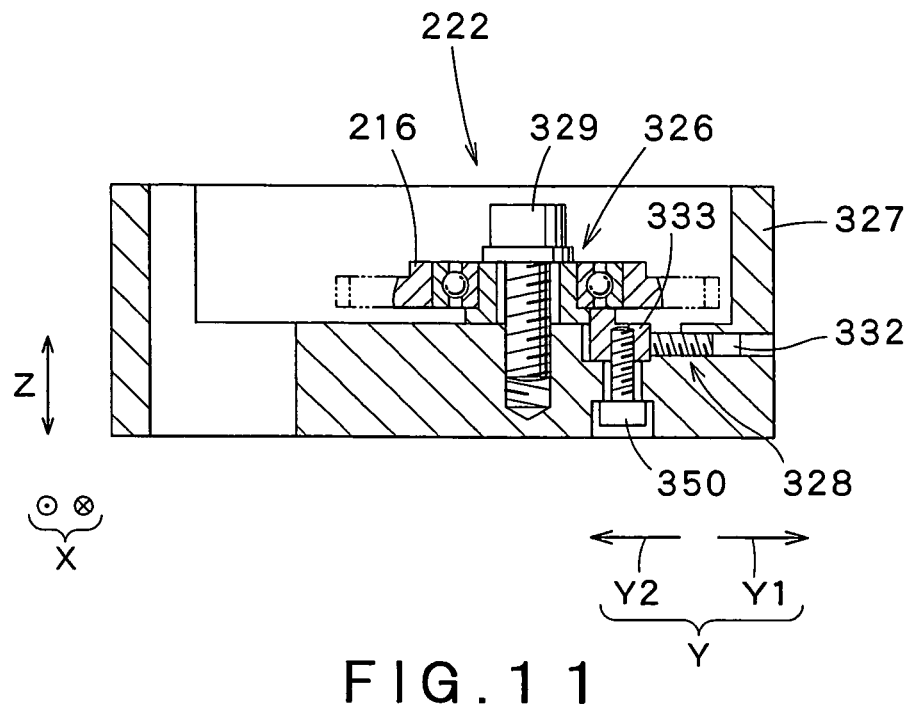
FIG. 11 is a sectional view taken on the line S7-S7 in FIG. 8.
Figure 12:
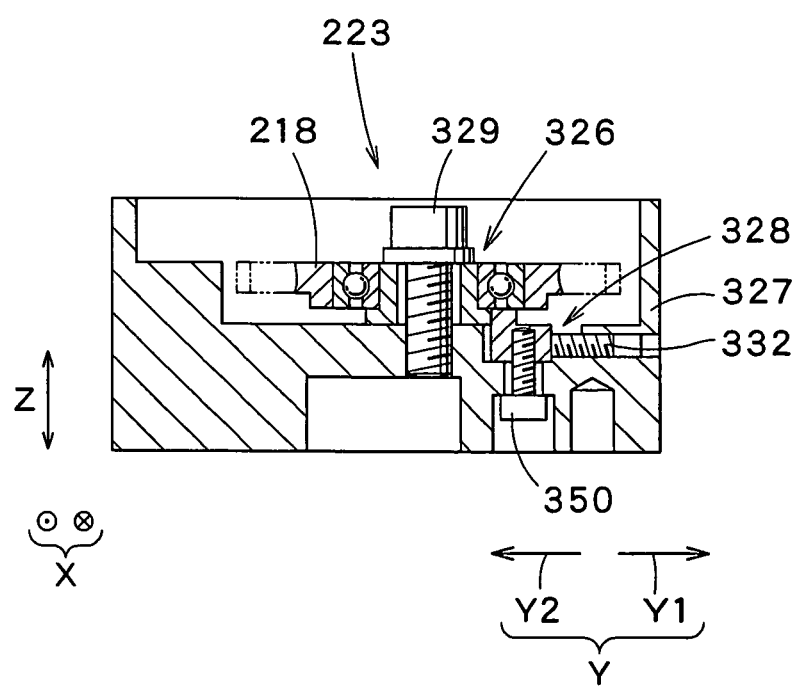
FIG. 12 is a sectional view taken on the line S8-S8 in FIG. 9.

Referring to FIG. 8, the second gear type transmission mechanism 201b has a gear train including stationary gears 215, 217 and 219 and idle gears 216 and 218. The stationary gears 215, 217 and 219 and the idle gears 216 and 218 are arranged alternately in a gear arranging direction A on the second arm 205. The adjacent gears of the gear train are meshed. Power is transmitted from the stationary gear 215 at a first end of the gear train with respect to the gear arranging direction A via the gears to the stationary gear 219 at a second end of the gear train with respect to the gear arranging direction A.

The stationary gear 219 at the second end of the gear train with respect to the gear arranging direction A is rotatably supported on the second longitudinal end part 205b of the second arm 205 and is fixed to the third arm 206. The third arm 206 can be turned relative to the second arm 205 by turning the stationary gear 219. The second gear type transmission mechanism 201b has a gear support member similar to that of the gear mechanism 20 for each of the idle gears 216 and 218. The center distances between the idle gear 216 and the stationary gears 215 and 217 and between the idle gear 218 and the stationary gears 217 and 219 are adjustable and the adjusted center distances can be maintained. Thus power can be transmitted from the gear 215 at the first end of the gear train with respect to the gear arranging direction A to the gear 219 at the second end of the gear train with respect to the gear arranging direction A through the gear train in which the gears are meshed without or substantially without any backlashes between the teeth of the meshed gears.

FIGS. 9 to 12 are sectional views of parts of the robot 200. Gear mechanisms 220, 221, 222 and 223 respectively including the idle gears 211, 213, 216 and 218 are similar in construction to the foregoing gear mechanism 20. Therefore, parts of the gear mechanisms 220, 221, 222 and 223 like or corresponding to those of the gear mechanism 20 are denoted by reference characters obtained by adding 300 to the reference characters designating the parts of the gear mechanism 20 and the description thereof will be omitted. In the gear mechanisms 220 to 223, component members 327 of the robot arms 204 and 205 are base body members. The component members 327 of the robot arms define spaces for holding the stationary gears and the idle gears. The stationary gears and the idle gears are disposed in the spaces defined by the component members of the robot arms. Second threaded holes into which retaining members 332 of the gear mechanisms are screwed are formed in the component members 327 in the same direction, and the threaded holes open outside on the same side of the component members 327. Thus the operator can easily screw the retaining members 332 into the second threaded holes of the plurality of gear mechanisms, which improves convenience.

Referring to FIGS. 9 to 12, each of the gear support members of the gear mechanisms 220 to 223 includes a support member 326, a retaining mechanism 328, a first bolt 329 and a second bolt 350. The retaining mechanism 328 includes retaining members 332 and a contact member 333. Each of the idle gears 211, 213, 216 and 218 is supported by the support member 326. The first bolt 329 presses the support member 326 in an axial direction Z against the component member 327. The contact member 333 is pressed in the approaching direction Y2 against the support member 326. The gear mechanisms 220 to 223 are similar to the foregoing gear mechanism 20 in construction and hence further description thereof will be omitted.

As mentioned above, the robot 200 of the present invention is provided with the gear mechanisms 220, 221, 222 and 223. The stationary gears and the idle gears are arranged alternately in the gear mechanisms 220, 221, 222 and 223. Dimensional errors in the component parts of the robot 200 can be compensated and power can be transmitted through the gear trains to the second arm 205 and the third arm 206 without or substantially without backlashes between teeth of the meshed gears by adjusting the center distances between the gears. When backlashes are zero or substantially zero, the predetermined center distances can be maintained even if impact forces are exerted on the support member 26 when the stationary gears 21 and 22 rotate in the normal direction and when the same gears 21 and 22 rotate in the reverse direction.

Sometimes the robot arms 204 and 205 collide against an obstacle due to operator's erroneous operation. When the robot arms 204 and 205 collide against an obstacle, an impact force is transmitted from the stationary gears via the idle gears to the support members 326. The robot 200 provided with the gear mechanisms can prevent increase in the center distances between the gears beyond the desired distances. Therefore, backlashes between the teeth of the meshed gears do not need to be adjusted every time the robot arms 204 and 205 collide against an obstacle and the robot can move accurately. Maintenance work necessary when the gears are dislocated can be omitted.

Moreover, the gear at one end of the gear train is engaged with a pinion mounted on the output shaft of a motor. Therefore, an impact force that acts on the robot arm when the robot arm collides against an obstacle causes the output shaft of the motor to make idle rotation. Thus the impact force can be smoothly absorbed and the gears will not be damaged.

The transmission system of the robot 200 including the gear type transmission mechanisms is rigid as compared with a transmission system including belt-type transmission mechanisms. Therefore, the robot arms 205 and 206 of the robot 200 can be accurately positioned. Since the gears are retained such that the backlashes between the teeth of the meshed gears are zero or substantially zero, the ability of the robot to achieve accurate positioning can be maintained. Therefore, the robot is suitable for use requiring accurate positioning, such as carrying a semiconductor wafer. The use of the robot in this embodiment is not limited to carrying a semiconductor wafer and the robot can be applied to various uses.

Figure 13:
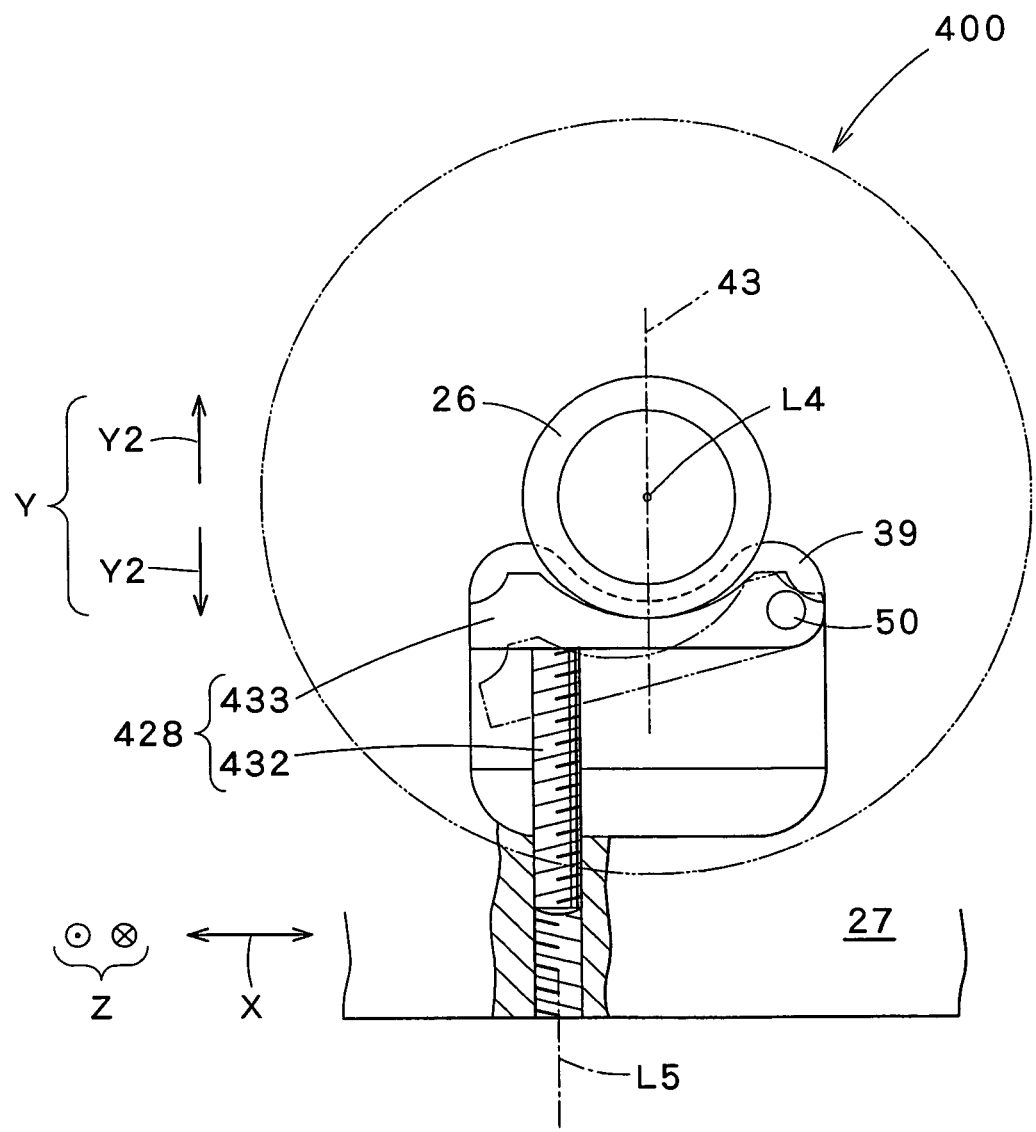
FIG. 13 is a partly cutaway plan view of a gear mechanism 400 in another embodiment according to the present invention.

FIG. 13 is a partly cutaway plan view of a gear mechanism 400 in another embodiment according to the present invention. The gear mechanism 400 excluding a retaining mechanism 428 is similar to the foregoing gear mechanism 20. Therefore, parts of the gear mechanism 400 like or corresponding to those of the foregoing gear mechanism 20 are denoted by the same reference characters and description thereof will be omitted and only parts of the gear mechanism 400 different from those of the gear mechanism 20 will be described.

The retaining mechanism 428 includes a retaining member 432 and a contact member 433. The contact member 433 is supported by a second bolt 50. The contact member 433 is fixed in place when the second bolt 50 is fastened. The contact member 433 can turn about the axis of the second bolt 50 when the second bolt 50 is unfastened. The second bolt 50 is disposed on one side of an imaginary plane containing the axis L4 of rotation of an idle gear 26 and parallel to approaching and leaving directions Y with respect to widthwise directions X. The retaining member 432 is disposed on the other side of the imaginary plane 43 with respect to the widthwise directions X.

The contact member 433 is turned to bring the contact member 432 into contact with the flange 35 of a support member 26. Then, the retaining member 433 screwed in a threaded hole formed in a base body member 27 is screwed so as to advance in the approaching direction Y2 to push the contact member 433. Thus the retaining member 433 can be brought into indirect contact through the contact member 433 with the support member 26. The gear mechanism has the same effects as the foregoing gear mechanism. The contact member 433 can be easily positioned and easily fixed.

Figure 14:
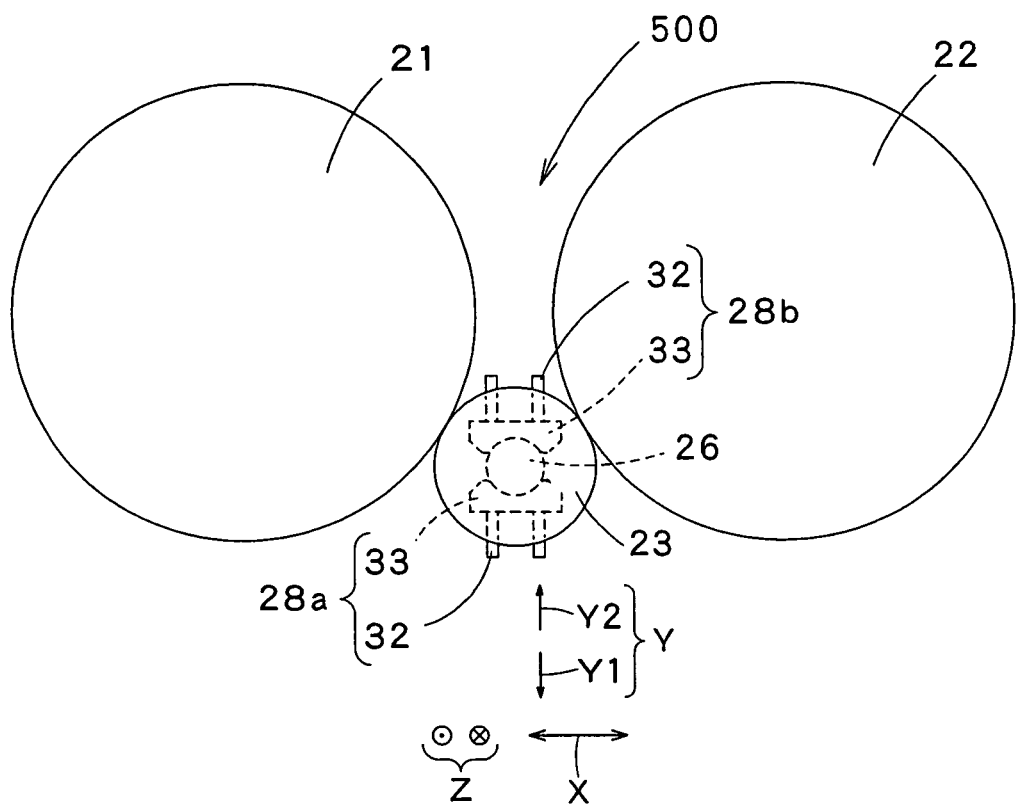
FIG. 14 is a schematic plan view of a gear mechanism 500 in still another embodiment according to the present invention.

FIG. 14 is a schematic plan view of a gear mechanism 500 in still another embodiment according to the present invention. The gear mechanism 500 is similar to the foregoing gear mechanism 20 and differs from the gear mechanism 20 in the number and arrangement of retaining mechanisms. Parts of the gear mechanism 500 like or corresponding to those of the gear mechanism 20 are denoted by the same reference characters and the description thereof will be omitted.

The gear mechanism 500 is provided with a plurality of retaining mechanisms. In this embodiment, the gear mechanism 500 is provided with two retaining mechanisms 28a and 28b. The retaining mechanisms 28a and 28b are disposed on the opposite sides, respectively, of a support member 26 with respect to approaching and leaving directions Y. Each of the retaining mechanisms 28a and 28b has retaining members 32 and a contact member 33. The retaining members 32 press the contact member 33 against the support member 26. The retaining mechanisms 28a and 28b can maintain desired center distances between the gears with higher reliability. For example, even if backlashes are set at predetermined values which are not zero, the predetermined center distances can be maintained even if impact forces are exerted on the support member 26 when the stationary gears 21 and 22 rotate in the normal direction and when the same gears 21 and 22 rotate in the reverse direction.

Figure 15:
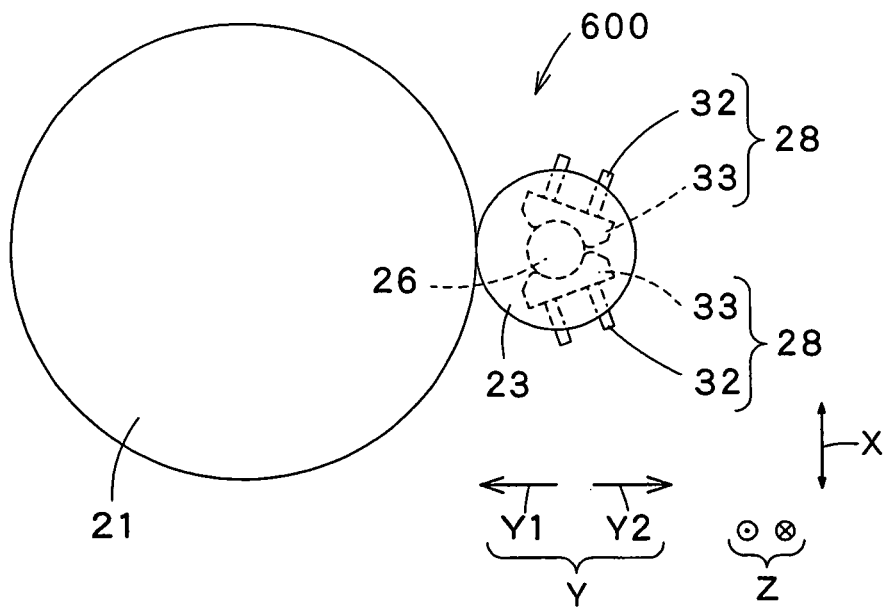
FIG. 15 is a schematic plan view of a gear mechanism 600 in still another embodiment according to the present invention.

FIG. 15 is a schematic plan view of a gear mechanism 600 in still another embodiment according to the present invention. In the gear mechanism 600, a stationary gear 21 and an idle gear 23 are meshed with each other. The gear mechanism 600 is similar to the gear mechanism 20 in other respects. Retaining members 32 presses contact members 33 against a support member 26. Thus a desired center distance between the gears can be maintained. Preferably, the gear mechanism 600 is provided with a plurality of retaining mechanisms 28 as shown in FIG. 15.

Figure 16:
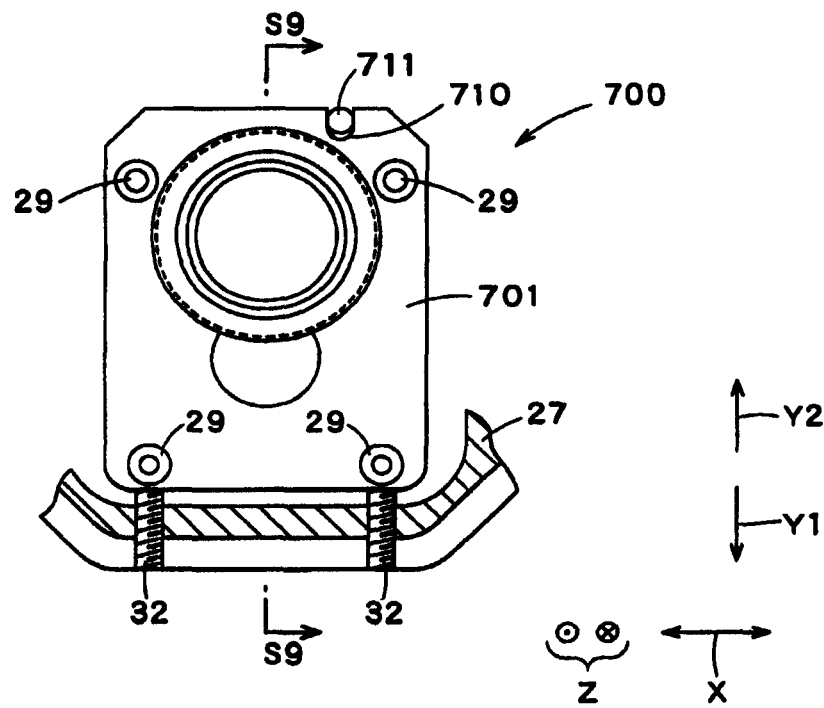
FIG. 16 is a partly cutaway plan view of a gear mechanism 700 in still another embodiment according to the present invention.
Figure 17:
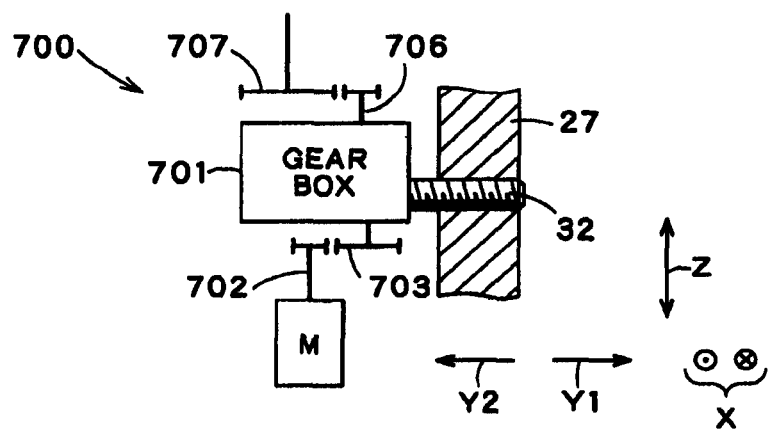
FIG. 17 is a typical sectional view of the gear mechanism 700.
Figure 18:
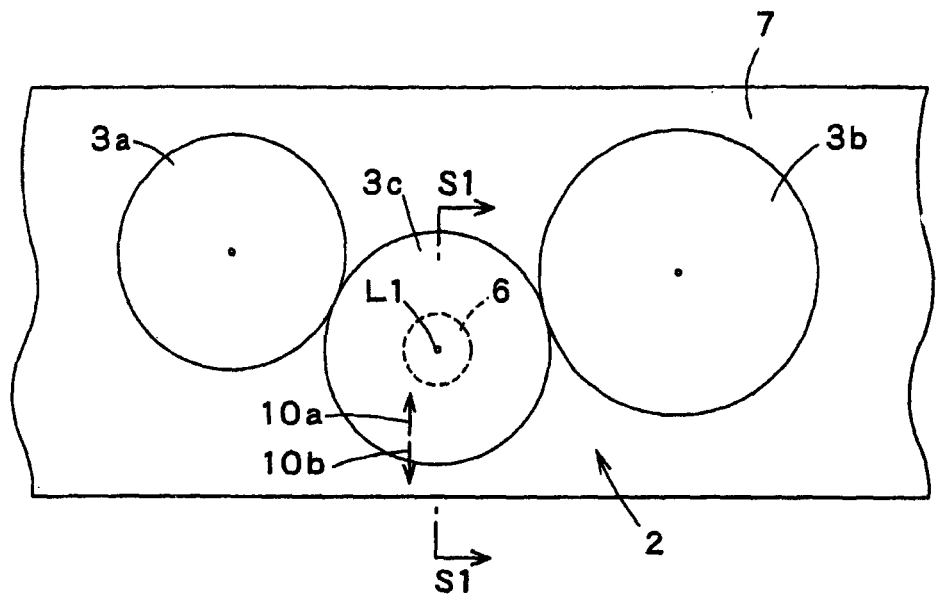
FIG. 18 is a schematic plan view of a known gear mechanism 2, in which three meshed gears 3a, 3b and 3c are shown.
Figure 19:
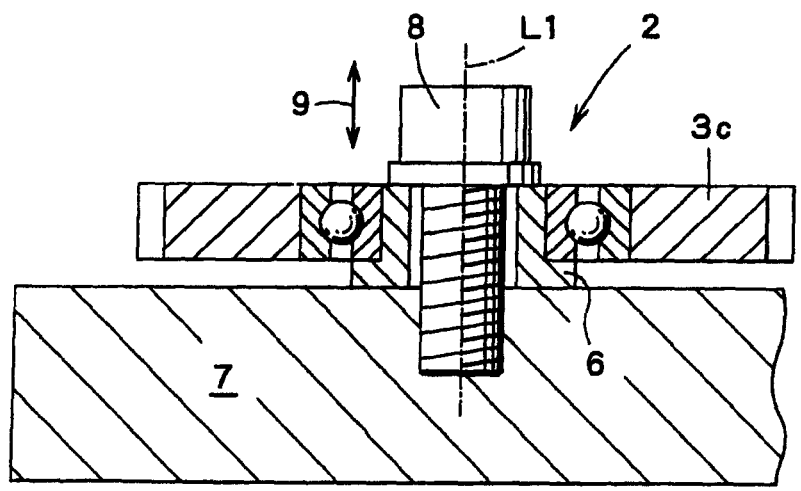
FIG. 19 is a sectional view taken on the line S1-S1 in FIG. 18.

FIG. 16 is a partly cutaway plan view of a gear mechanism 700 in still another embodiment according to the present invention. FIG. 17 is a typical sectional view of the gear mechanism 700. In each of the foregoing gear mechanisms 20. 400, 500 and 600, the support member 26 supports the idle gear 23. However, the support member 26 may indirectly support a plurality of gears. For example, the support member 26 may be a gear box provided with a plurality of rotatably supported gears. The gear mechanism 700 excluding the support member 26 is similar in construction to the foregoing gear mechanisms.

The gear mechanism 700 includes a base body member 27, a gear box 701, retaining members 32 and first bolts 29. The gear box 701 rotatably supports a plurality of meshed gears. A gear train formed in the gear box 701 transmits power applied to an input gear 703 to an output gear 706.

The input gear 703 is engaged with a drive pinion 702 which is not a part of the gear box. The output gear 706 is engaged with a driven gear 707 which is not a part of the gear box. For example, the gear train of the gear box 701 reduces the input rotating speed of the drive pinion 702 and a lowered rotating speed is transmitted to the driven gear 707.

The drive pinion 702 and the driven gear 707 are rotatably supported on the base body member 27 and are restrained from sliding displacement.

The gear box 701 is mounted on the base body member 27 so as to be movable in approaching and leaving directions Y, namely, an approaching direction toward the respective axes of rotation of the drive pinion 702 and the driven gear 707 and a leaving direction away from the respective axes of rotation of the drive pinion 702 and the driven gear 707. Thus the input gear 703 can be moved toward and away from the drive pinion 702 and the output gear 706 can be moved toward and away from the driven gear 706.

The gear box 701 is pressed in the axial direction Z and is fastened to the base body member 27 by the first bolts 29. The first bolts 29 are unfastened to allow the gear box 702 to move in the gear box moving directions Y and are fastened to restrain the gear box 701 from movement in the gear box moving directions Y.

The retaining members 32 screwed in the threaded holes formed in the base body member 27 press the gear box 701 in the approaching direction Y2. Thus the movement of the gear box 701 in the leaving direction Y1 can be surely prevented.

A displacement preventing mechanism is incorporated into the gear box 701 to prevent the displacement of the gear box 701 in the widthwise directions X. More concretely, a slot 710 extending in the gear box moving directions Y is formed in the gear box 701 and a pin 711 is attached to the base body member 27. The pin 711 has a widthwise dimension approximately equal to the width of the slot 710, namely, a dimension in the widthwise direction X, and a longitudinal dimension smaller than the length of the slot 710 in the gear box moving direction Y. The pin 711 engages with the gear box 701 to limit the movement of the gear box 701 in the widthwise direction X when the gear box 701 moves in the widthwise direction X.

The displacement preventing mechanism may be of any type, provided that the displacement preventing mechanism includes members engaged with each other, respectively combined with the gear box 701 and the base body member 27 and capable of restraining the gear box 701 from movement in the widthwise directions X. For example, the displacement preventing mechanism may include a member protruding from the gear box 701 and the base body member 27 provided with a recess in which the member protruding from the gear box 701 can engage. The gear box 701 may be provided with a recess in which the retaining member can be fitted.

The effect of the gear mechanism 700 is the same as those of the foregoing gear mechanisms. The gear mechanism may be incorporated into the robot 200, the gear mechanisms 20 and 700 may be used in combination to achieve further accurate positioning of the arms of a robot.

The foregoing embodiments are only examples of the present invention and many changes and variations can be made therein without departing from the scope of the invention. For example, the meshed gears are not limited to spur gears and may be gears other than spur gears, such as bevel gears, pinions and such. Any suitable fastening member capable of restraining the movement of the support member 26 in the approaching and leaving directions Y may be used instead of the first bolt 29 and the second bolt 50. For example, a rail for guiding the support member 26 for movement in the approaching and leaving directions Y may be used instead of the first bolt 29. A rail for guiding the contact member 33 for movement in the approaching and leaving directions Y may be used instead of the second bolt 50. The contact member may be omitted and the retaining member may be brought into direct contact with the support member.

Although the present invention has been described in its preferred embodiments with a certain degree of particularity, obviously many changes and variations are possible therein. It is therefore to be understood that the present invention is not limited to the embodiments specifically described herein in its practical application and the present invention may be practiced otherwise than as specifically described herein without departing from the scope and spirit thereof.

The invention claimed is:

1. A gear mechanism comprising:
a base body member;
a first gear supported on the base body member so as to rotate about a first axis of rotation;
a second gear capable of being meshed with the first gear;
a support member supporting the second gear so as to rotate about a second axis of rotation and placed on the base body member so as to be movable in approaching and leaving directions respectively toward and away from the first axis of rotation;
a support member fastening member configured to fasten the support member to the base body member, the support member fastening member in an unfastened state allowing the support member to move in the approaching and leaving directions relative to the base body member and in a fastened state restraining the support member from moving relative to the base body member by way of a frictional resistance, a contact member configured to be able to move in the approaching and leaving directions and be brought into contact with less than an entire circumference of the support member;

a retaining member engaged in a threaded hole formed in the base body member so as to be capable of being turned to move forward and backward in the approaching and leaving directions, the contact member being moved in the approaching and leaving directions by turning the retaining member to move forward or backward relative to the base body member so that the retaining member supports the support member via the contact member to restrain the support member from moving in the leaving direction away from the first axis of rotation; and a contact member fastening member for mounting the contact member on the base body member, the contact member fastening member in an unfastened state allowing the contact member to move in the approaching and leaving directions relative to the base body member and in a fastened state restraining the contact member from moving relative to the base body member by way of a frictional resistance.

2. The gear mechanism according to claim 1, wherein the contact member and the support member come into contact with each other in a state wherein the contact member is fitted in the support member or the support member is fitted in the contact member.

3. The gear mechanism according to claim 1, wherein a contact member holding space for holding the contact member therein is formed in the base body member, a gap is formed between a side surface of the contact member holding space and a side surface of the contact member in the approaching and leaving directions, so that the contact member is able to be guided for movement in the approaching and leaving directions.

4. The gear mechanism according to claim 1, wherein the contact member fastening member is disposed on one side with respect to a plane containing the second axis of rotation and parallel to the approaching and leaving directions so that the contact member fastening member supports the contact member so as to be able to turn about the contact member fastening member in an unfastened state, and wherein the retaining member is disposed on an other side with respect to the plane so as to support the contact member by a part of the contact member lying on the other side of the plane.

5. The gear mechanism according to claim 1, wherein the retaining member comprises a plurality of retaining members disposed on both sides, respectively, of a plane containing the second axis of rotation and parallel to the approaching and leaving directions.

6. The gear mechanism according to claim 1, wherein the support member is a gear box rotatably supporting a plurality of gears including the second gear.

7. A robot comprising:
a robot arm; and
driving means configured to drive the robot arm for displacement, wherein the driving means has a transmission mechanism including the gear mechanism according to claim 1, the transmission mechanism transmitting a power from a driving source to the robot arm to drive the robot arm for displacement.

8. The gear mechanism according to claim 1, wherein the contact member comprises a plurality of contact members, the contact members respectively being brought into contact with the support member.

9. The gear mechanism according to claim 1, wherein the contact member is configured to be able to rotate about the contact member fastening member when the contact member fastening member is in an unfastened state, wherein the retaining member is turned to move forward relative to the base body member so as to make the contact member rotate about the contact member fastening member.

10. A gear mechanism comprising:
a base body member;
a driven gear rotatably supported on the base body member;
a gear box mounted on the base body member so as to be movable in approaching and leaving directions respectively toward and away from a rotational axis of the driven gear, the gear box being provided with a fitting portion, the gear box rotatably supporting an output gear,
wherein the output gear is meshed with the driven gear by moving the gear box toward the rotational axis of the driven gear;
a retaining member mounted on the base body member and directly or indirectly supporting the gear box from an opposite side of the rotational axis of the driven gear across the output gear; and
a pin fixed to the base body member, the pin configured to be fitted into the fitting portion of the gear box to restrain a displacement of the gear box in a widthwise direction perpendicular to the approaching and leaving directions.

11. The gear mechanism according to claim 10, wherein the gear box rotatably supports an input gear and power is transmitted from the input gear to the output gear.

12. The gear mechanism according to claim 11, further comprising a drive gear from which power is applied to the input gear.

13. The gear mechanism according to claim 12, wherein the gear box is mounted on the base body member so as to be moveable in approaching and leaving directions respectively toward and away from rotational axes of the drive gear and of the driven gear, and the input gear and the output gear are meshed respectively with the drive gear and the driven gear by moving the gear box toward the rotational axes of the drive gear and the driven gear.

14. The gear mechanism according to claim 10, wherein the retaining member is engaged in a threaded hole formed in the base body member so as to be capable of being turned to move forward and backward in the approaching and leaving directions.

15. The gear mechanism according to claim 10, further comprising a plurality of retaining members, wherein more than one of the plurality of retaining members are arranged in a widthwise direction.

16. The gear mechanism according to claim 10, wherein the fitting portion is a slot.

* * * * *